Figure 1:
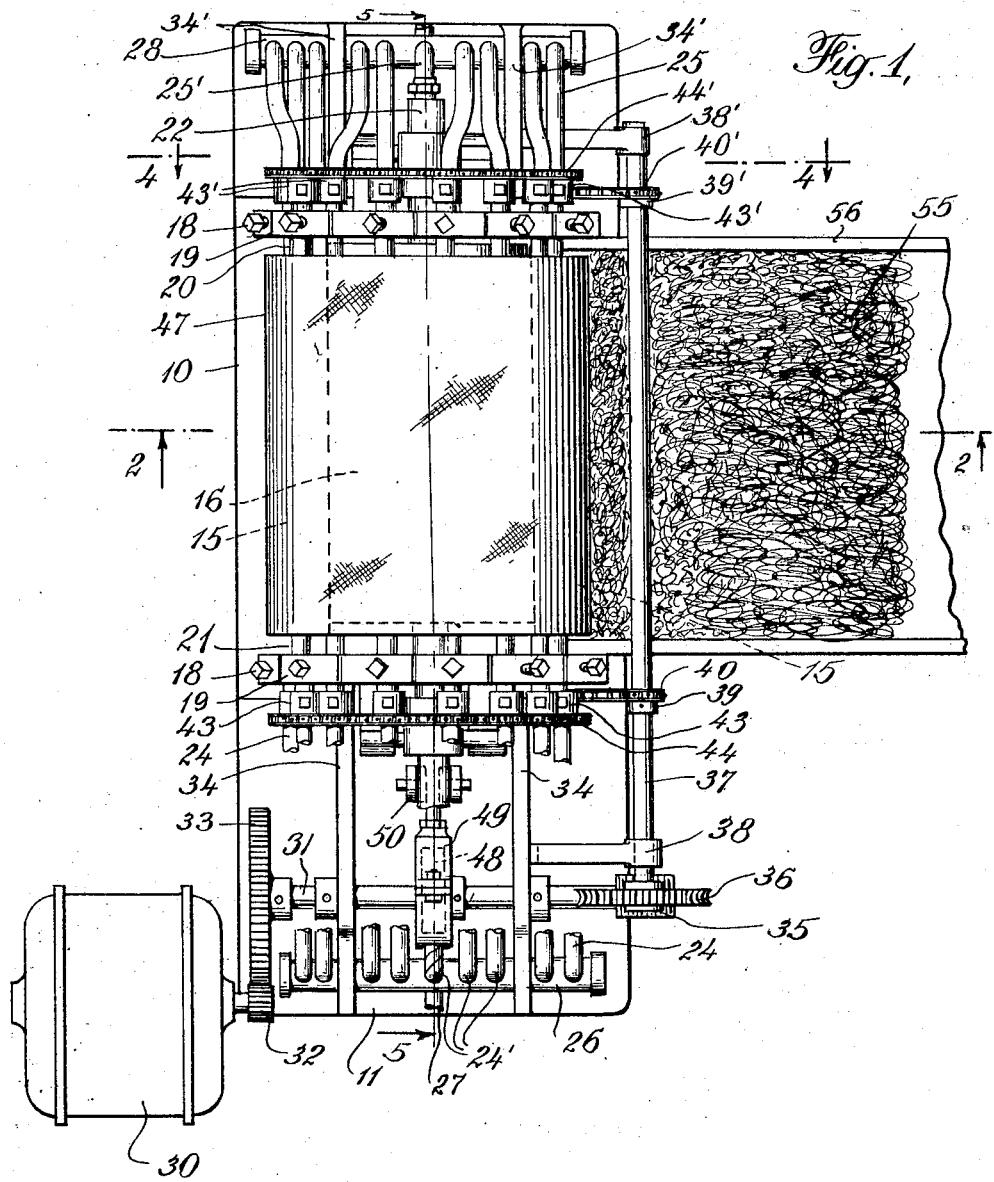

July 31, 1928.

F. C. STURGIS 1,679,100

ROTARY FELTING MACHINE

Filed Sept. 15, 1927

3 Sheets-Sheet 1

INVENTOR.
Frederick C. Sturgis
BY
Bennie, Davis, Nixon & Edmonds
ATTORNEYS

July 31, 1928.  
F. C. STURGIS  
1,679,100  
ROTARY FELTING MACHINE  
Filed Sept. 15, 1927  3 Sheets-Sheet 2
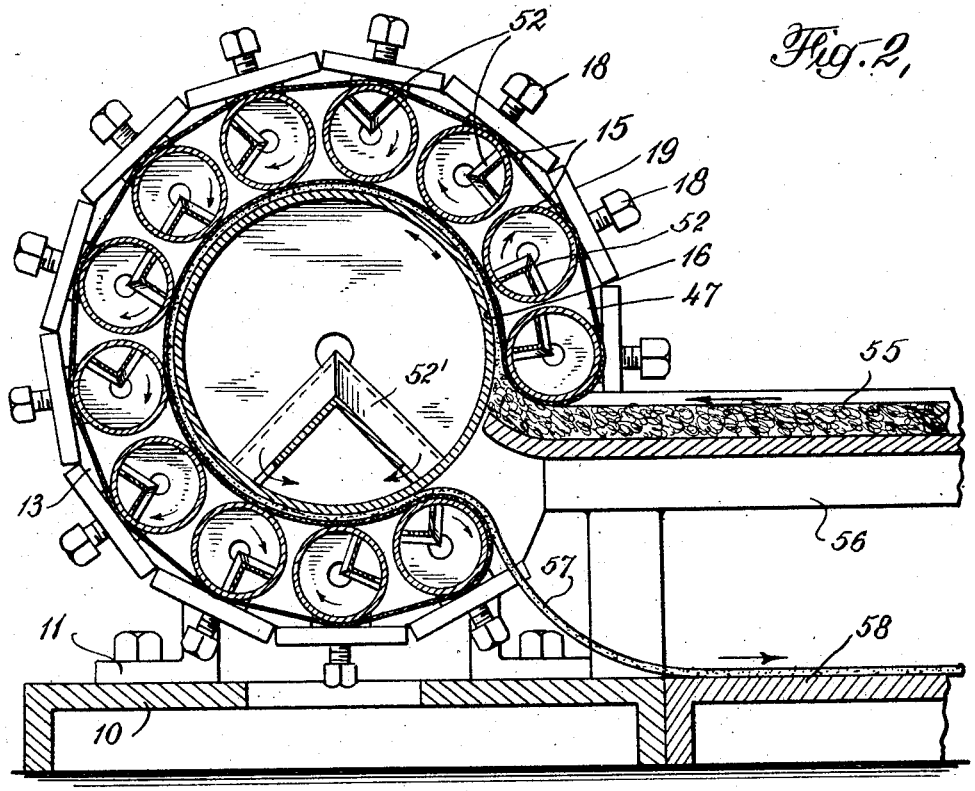
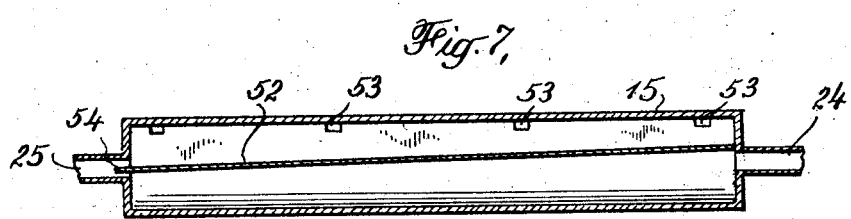
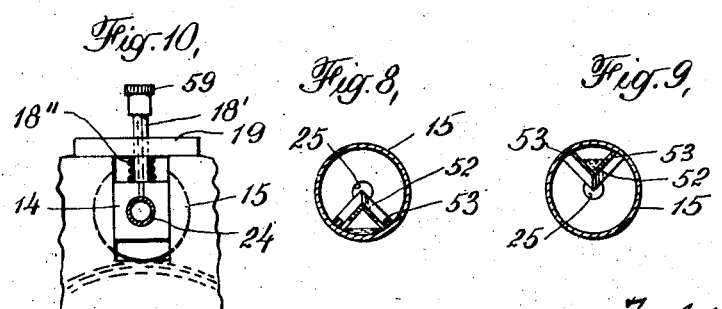
INVENTOR  
Frederick C. Sturgis  
BY  
ATTORNEYS July 31, 1928.
F. C. STURGIS
1,679,100
ROTARY FELTING MACHINE
Filed Sept. 15, 1927
3 Sheets-Sheet 3
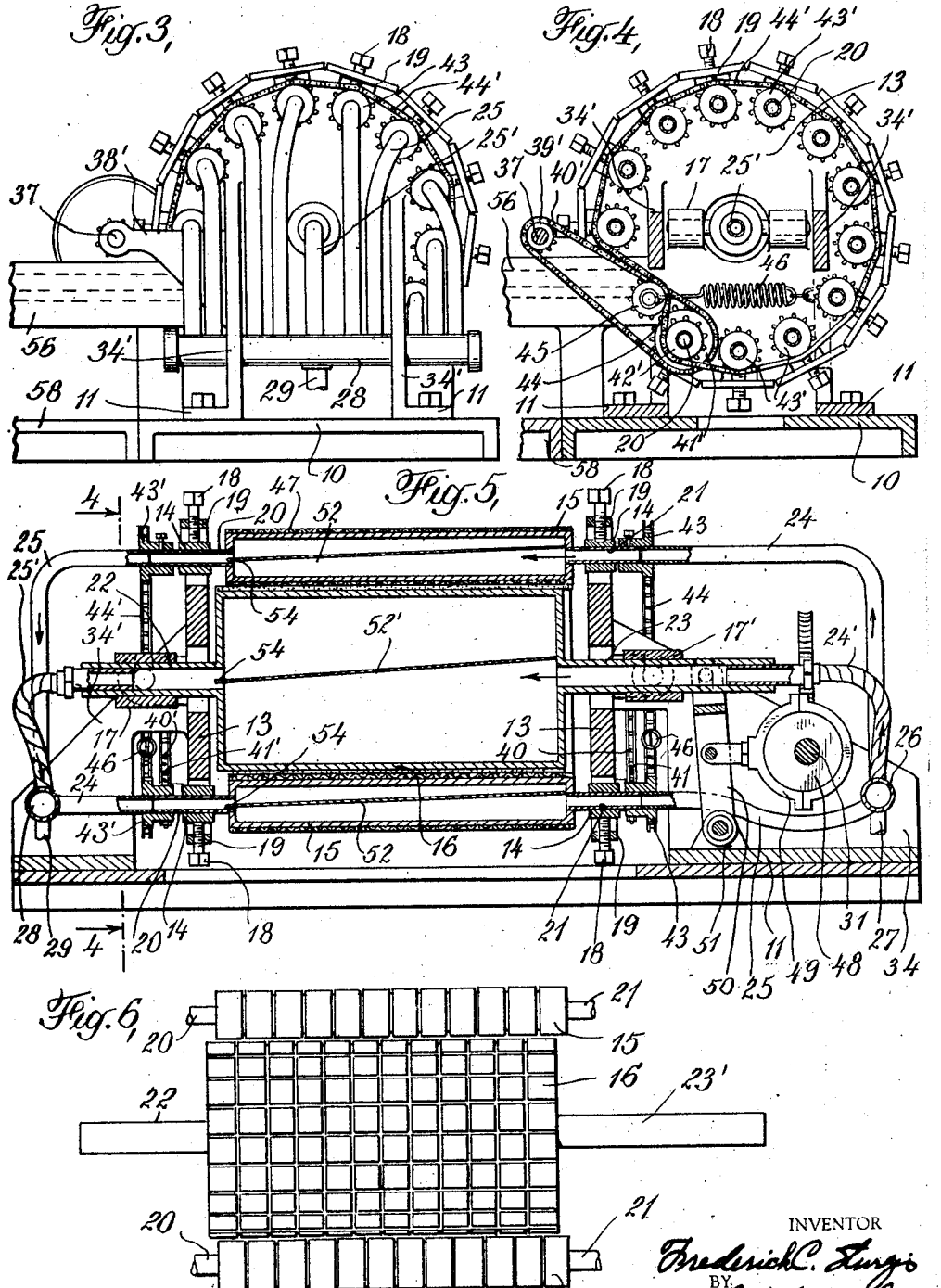

Patented July 31, 1928.

1,679,100

UNITED STATES PATENT OFFICE.

FREDERICK C. STURGIS, OF NEWARK, NEW JERSEY.

ROTARY FELTING MACHINE.

Application filed September 15, 1927. Serial No. 219,653.

This invention relates to felting machines, and is concerned particularly with felting machines of the rotary type as compared with those of the flat plate type. In this latter form of felting machine, the carded hair or other fibre is placed between two heavy flat plates, one or both of which are given a reciprocating or rotary motion or a combined reciprocating and rotating motion whereby the fibres or strands of the felt material are worked into a homogeneous sheet of felt by the combined pressure and friction produced between these moving plates. The coacting surfaces of the plates are usually roughened or "waffled" to procure an increased frictional effect and are usually heated by suitable means such as steam or hot air. These flat plate felting machines have been satisfactory heretofore, but are open to a number of manufacturing objections. For example, it is usually desirable to make the felt in large and long sheets, so that in order to produce sheets of this size, the flat plate machine must be a heavy and massive affair which occupies a large floor space. Furthermore, such machines can only operate intermittently since they must be opened when the felt sheet is finished and charged with a new layer of carded felt material before they can again be placed into operation. In addition to the loss of time and labor involved this intermittent operation is further objectionable in that the successive sheets of felt produced by the machine are frequently not of uniform quality and texture due to non-continuous and non-uniform operation. Among other objections to the flat plate machine is the comparatively large amount of power which these machines require as well as labor involved in their operation.

In the machine of this invention the objections attending the use and operation of the flat plate felting machine have been eliminated. The present machine is compact, occupying considerably less floor space than the flat plate machine, and is much lighter in weight. Its operation is continuous and automatic, requiring only a continuous supply of carded felt material, while the finished felt emerges from the machine as a continuous sheet of uniform width and density. Inasmuch as the machine forms each portion of felt in the sheet in the same way and under the same conditions, a uniform grade of felt is obtained for each portion of the continuous sheet, no matter how long it may be.

In its preferred embodiment, the machine of this invention consists essentially of a series of heated felting rollers which engage the periphery of and frictionally drive a heated central cylinder, this cylinder being given an axial reciprocating movement relative to the felting rolls by means of suitable mechanism. An endless flexible apron envelops the felting rolls and passes between them and the central cylinder, the carded felt material being introduced between this apron and the central cylinder, the coaction between the felting rolls, cylinder and apron effecting the advancement of the felt material which is simultaneously worked by the rotary and axial motion between the rolls and the cylinder into a homogeneous sheet of felt. Means are provided for adjusting the pressure between the rolls and the cylinder for procuring a predetermined felt density, as well as means for supplying steam to the rolls and cylinder and for removing the water of condensation therefrom.

For a better understanding of the invention reference is made to the accompanying drawings in which, Fig. 1 is the plan view of the felting machine of this invention; Fig. 2 is a transverse cross section of the machine taken along line 2—2 of Fig. 1; Fig. 3 is an end view of the machine; Fig. 4 is a cross-sectional end view taken along line 4—4 of Fig. 1; Fig. 5 is a longitudinal cross section of the machine taken along line 5—5 of Fig. 1; Fig. 6 is a view of the felting rolls and cylinder showing the axial displacement of the central cylinder; Fig. 7 is a longitudinal section of one of the felting rolls; Figs. 8 and 9 are cross sections of one of the felting rolls shown in two different angular positions, and Fig. 10 illustrates a modified form of supports for the felting rolls.

In these drawings numeral 10 designates the base upon which the machine is mounted by means of suitable feet 11, these feet being extended at each end of the machine to supply a support for different portions of the operating mechanism. Projecting upward are a pair of end frames 13 which support the journals 14 of the felting rolls 15 while the large central cylinder 16 is supported at each end by yokes 17 and 17' disposed in slots formed in upright flanges 34 and 34', respectively, which connect feet 11 to side frames 13. If desired, yokes 17 and 17' may be made integral with or directly supported on the frame.

As shown especially in Fig. 2, the felting rolls 15 are arranged circumferentially around the outer surface of large cylinder 16. One form of mounting these rolls 15 is illustrated in Fig. 10, in which journals 14 carry rods 18' which are slidable in apertures in plate 19, a relatively stiff coil spring 18'' being arranged between plate 19 and journal 14. Instead of springs 18'', any other equivalent pressure means may be employed, such as air or hydraulic cylinders and the like. In this way the journals 14 of rolls 15 are resiliently supported, and the rolls are self-adjusting with respect to the surface of cylinder 16. If desirable, lubricant cups 59 may be mounted in the ends of rods 18', and a passage formed through these rods to journals 14, whereby the latter may be lubricated. In another form of support for rolls 15 they are positively located and may be radially adjusted with respect to the cylinder 16 by means of studs 18 which are threaded into plates 19 arranged around the ends of the machine and supported by frames 13. These studs 18 engage the journals 14 of rolls 15 so that they may be adjusted to procure the pressure desired between rolls 15 and cylinder 16 as is apparent in Figs. 2, 3, 4 and 5. These rolls 15 are hollow and their axles 20 and 21 are also made hollow for the passage of steam. This construction is also employed in large cylinder 16 which is provided with hollow axles 22 and 23 in a similar manner.

In order to heat the rolls 15 and cylinder 16, their respective hollow axles are fitted with pipes 24 at one side of the machine and similar pipes 25 at the other side of the machine. Pipes 24 are connected to a manifold or header 26 to which steam is supplied from a suitable source by way of pipe 27, while pipes 25 at the opposite side of the machine are connected to manifold or header 28 provided with a suitable drain pipe 29. Inasmuch as all of the rolls are adapted to rotate the joints connecting pipes 24 and 25 to them are slip joints so as to permit this rotation.

The driving means for the machine preferably comprises an electric motor 30 which drives shaft 31 by means of pinion 32 and meshing gear 33. This shaft 31 is suitably journaled in upright flanges 34 which connect feet 11 to one of the side frames 13. The end of shaft 31 which is opposite the motor is provided with a worm 35 which meshes with a worm wheel 36 mounted on the end of cross shaft 37. This cross shaft 37 is journaled in brackets 38 and 38' which are securely fastened to the upright flanges 34 and 34', respectively, which support side frames 13 upon feet 11.

As shown in Fig. 1 shaft 37 is provided with two spaced sprockets 39 and 39' disposed at opposite sides of the machine. These sprockets are connected by flexible drive chains 40 and 40' to similar sprockets 41 and 41' respectively securely mounted on opposite ends of axles 21 and 20 of one of the small rolls 15 so that this roll is driven from shaft 37. Sprockets 41 and 41' are provided with integral sprockets 42 and 42' and these sprockets are connected to similar sprockets 43 and 43' securely mounted on the axles 21 and 20 of the remaining rolls 15 by means of endless flexible chains 44 and 44'. As shown in Fig. 4 an idler sprocket 45 is mounted at each end of the machine and around which chains 44 and 44' pass. This sprocket is restrained by means of a coil spring 46 against chains 44 and 44' so as to take up the slack in the chains and maintain them at a constant tension.

As shown particularly in Fig. 6 the rolls 15 are provided with circular grooves while the cylinder 16 is waffled in order to procure a greater frictional effect between them. Interposed between the rolls 15 and cylinder 16, however, is a flexible apron 47 made of burlap cloth or other suitable material, this apron enveloping rolls 15 in the manner shown in Fig. 2, so that, as rolls 15 rotate, apron 47 is continually advanced relatively to cylinder 16. The friction between the rolls 15 which are driven as a unit and cylinder 16 causes the latter to be driven at the same peripheral rate that the rolls are driven. In addition to the rotary motion imparted to cylinder 16, it is given a reciprocating motion so that it moves end to end relatively to rolls 15. This reciprocation is obtained by means of an eccentric 48 mounted on drive shaft 31, as shown in Fig. 5. The eccentric strap 49 is suitably connected to a rocker 50 the lower end of which is journaled in a bracket 51 secured to foot 11. The free end of rocker 50 is bifurcated so as to embrace extended axle 23 of cylinder 16, the axle 22 and 23 being journaled for axial freedom of movement. If desired, an equivalent driving arrangement may be employed, such as connecting the eccentric directly to the repicrocatory shaft 23, instead of through the rocker 50. Accordingly, as the machine operates, eccentric 48 imparts a reciprocating motion to cylinder 16 while rolls 15 by their frictional contact with cylinder 16 drive the latter in a rotary direction. In order to allow for this axial movement of cylinder 16 steam pipes 24' and 25' at each end of cylinder 16 are made of flexible material. This reciprocating movement of cylinder 16 relative to rolls 15 is illustrated in an exaggerated way in Figs. 5 and 6, it being understood that the reciprocation is equal in both axial directions.

In order to remove the water of condensation of the steam introduced into rolls 15 by means of steam pipes 24 mechanical dippers are disposed within the rolls 15. These mechanical dippers are illustrated in Figs. 2, 5 and 7 to 9 inclusive and consist of angle pieces 52 which are welded or otherwise attached along their edges to the interior surfaces of the rolls. The ends of the angles 52 are similary attached to the ends of the rolls while the central edges of the angles are placed to substantially coincide with the axes of the rolls, so that steam entering from tubes 24 may have free ingress and the spent steam emerging from tubes 25 may have free egress. The lower edges of angles 52 are notched or slotted at 53 in that side which is placed in the direction of rotation of the rolls. Accordingly, the water formed by condensation of the steam enters the trough formed by angle irons 52 by way of slots 53 when these angle irons are in the position illustrated in Fig. 8, and as the rolls rotate the water entering slots 53 is scooped up by angles 52. When these angles are placed in the position illustrated in Figs. 7 and 9 the water will flow therefrom into discharge tubes 25, the outer end of angle 52 being provided with a suitable lip 54 which insures that the water flows into tubes 25 and will not return to the rolls. As illustrated in Figs. 2 and 5 the same construction is shown for cylinder 16 except that angle 52' is of larger size.

As shown in Fig. 2 the carded felt material 55 is supplied to the machine from a horizontal table 56, the felt material 55 being introduced between cylinder 16 and flexible apron 47, this flexible apron coacting with the surface of the cylinder to draw the felt material 55 between them. As the finished felt strip 57 emerges from the machine it is conducted along a lower platform 58 and is then rolled upon a mandrel in the form of a roll or the like.

In operation, the carded felt material 55 is continually supplied to table 56 and is drawn into the machine by the coaction of apron 47 and cylinder 16. As the felt material 55 progresses it is compressed between rolls 15 and cylinder 16 and at the same time it is worked into a homogeneous mass of felt by virtue of the rubbing action obtained by the reciprocating movement between the cylinder 16 and several rolls 15, this action being aided by heat and pressure. Accordingly, as cylinder 16 rotates and apron 47 advances the felt material 55 is continuously advanced until it emerges from the last roll and from apron 47 in the form of dense and homogeneous felt 57. The heating medium for the rolls and cylinder is preferably steam which is supplied to header or manifold 26 by means of steam pipe 27 from which it passes by way of tubes 24 into rolls 15 and also by way of flexible tube 24' into cylinder 16. Accordingly these rolls and cylinder are maintained at even temperature and the heat is transmitted to the felt as it passes between them. Since heat is abstracted from the steam, condensation will take place and in order to remove this water the dipper 52 in rolls 15 and dipper 52' in cylinder 16 come into action upon each revolution of rolls 15 and cylinder 16, whereby the water is discharged from rolls 15 by way of tubes 25 and from cylinder 16 by way of tubes 25'. Whatever uncondensed steam remains also passes out by way of tubes 25 and 25' into header or manifold 28 from which it is subsequently drained by means of tube 29. A predetermined density of the finished felt may be obtained by adjusting studs 18 whereby the space between roll 15 and source of cylinder 16 may be adjusted at will. In order to obtain uniform felting action between the rolls and the cylinder it is important that each roll be driven at a uniform rate, which rate is common for all rolls. In order to eliminate such differences in the action of the several rolls which may occur because of slack in the driving chains 44 and 44', a slack adjusting mechanism is provided in the way of idler 45 and its accompanying tension spring 46. By means of this idler, chains 44 and 44' are maintained at the uniform tension so that the relative effect of the several rolls 15 is constant.

It will be seen that the rotary felting machine of this invention provides numerous advantages over those heretofore employed. This machine is compact, occupying considerably less space than those in present use, and is much lighter in weight. Inasmuch as the machine operates continuously, no time is lost for recharging, nor is it necessary to employ more than one operator for several machines, whereas in the flat plate type of machine several operators were required for each time that the machine had to be periodically recharged in order to continue the felting operation. Furthermore, inasmuch as the machine is continuous and operates uniformly, a felt of uniform quality and density is obtained in unlimited supply, whereas in those machines that had to be recharged periodically this uniform felt could not be obtained.

I claim:—

1. In a rotary felting machine, the combination of a cylinder, a plurality of pressure rolls engaging the surface of the cylinder, means for driving said rolls at the same speed, said cylinder being driven by friction by the rolls, and means for imparting a reciprocating axial movement to said cylinder.

2. In a rotary felting machine, the combination of a cylinder, a plurality of pressure rolls engaging the surface of the cylinder, means for driving said rolls at the same speed, said cylinder being driven by friction by the rolls, a flexible apron enveloping the rolls and passing between them and the cylinder, and means for imparting a reciprocating relative movement between the rolls and the cylinder.

3. In a rotary felting machine, the combination of a cylinder, a plurality of pressure rolls engaging the surface of the cylinder, means for driving said rolls at the same speed, said cylinder being driven by friction by the rolls, means for supplying a heating agent severally to the rolls and cylinder, and means for imparting a reciprocating relative movement between the rolls and the cylinder.

4. In a rotary felting machine, the combination of a cylinder, a plurality of pressure rolls engaging the surface of the cylinder, means for driving said rolls at the same speed, said cylinder being driven by friction by the rolls, means for supplying steam severally to the rolls and to the cylinder, and devices in each roll and cylinder for removing the water of condensation.

5. In a rotary felting machine, the combination of a cylinder, a plurality of rolls spaced around and engaging the surface of the cylinder, driving means jointly connected to the rolls, a source of power, connections between said source and one of the rolls, the cylinder being driven by friction from said rolls, and mechanism driven from said source for imparting reciprocating motion to said cylinder.

6. In a rotary felting machine, the combination of a cylinder, a plurality of rolls spaced around and engaging the surface of the cylinder, driving means jointly connected to the rolls, a source of power, connections between said source and one of the rolls, the cylinder being driven by friction from said rolls, and a slack eliminating device for the driving means of the rolls.

7. In a rotary felting machine, the combination of a cylinder, a plurality of rolls spaced around and engaging the surface of the cylinder, driving means jointly connected to the rolls, a source of power, connections between said source and one of the rolls, the cylinder being driven by friction from said rolls, and means for adjusting the radial positions of each of said rolls relative to the surface of the cylinder.

8. In a rotary felting machine, the combination of a cylinder, a plurality of rolls spaced around and engaging the surface of the cylinder, driving means jointly connected to the rolls, a source of power, connections between said source and one of the rolls, the cylinder being driven by friction from said rolls, and steam inlet and outlet tubes connected to opposite ends of each roll and the cylinder.

9. In a rotary felting machine, the combination of a cylinder, a plurality of rolls spaced around and engaging the surface of the cylinder, driving means jointly connected to the rolls, a source of power, connections between said source and one of the rolls, the cylinder being driven by friction from said rolls, steam inlet and outlet tubes connected to opposite ends of each roll and the cylinder, and means in said rolls and cylinder for removing the water of condensation.

10. In a rotary felting machine, the combination of a hollow cylinder, a series of hollow rolls engaging the surface of the cylinder, sprockets on said rolls, a driving chain engaging each sprocket, a second sprocket on one of the rolls, a chain driving said second sprocket from a source of power whereby all rolls are driven, the cylinder being driven frictionally by the rolls, a flexible apron enveloping the rolls and passing between them and the cylinder, and means for introducing felt material between the apron and the cylinder.

11. In a rotary felting machine, the combination of a hollow cylinder, a series of hollow rolls engaging the surface of the cylinder, sprockets on said rolls, a driving chain engaging each sprocket, a second sprocket on one of the rolls, a chain driving said second sprocket from a source of power whereby all rolls are driven, the cylinder being driven frictionally by the rolls, a flexible apron enveloping the rolls and passing between them and the cylinder, and means for imparting a relative axial reciprocation between the rolls and the cylinder.

12. In a rotary felting machine, the combination of a hollow cylinder, a series of hollow rolls engaging the surface of the cyinder, sprockets on said rolls, a driving chain engaging each sprocket, a second sprocket on one of the rolls, a chain driving said second sprocket from a source of power whereby all rolls are driven, the cylinder being driven frictionally by the rolls, a flexible apron enveloping the rolls and passing between them and the cylinder, and means for adjusting the space between each roll and the cylinder.

13. In a rotary felting machine, the combination of a hollow cylinder, a series of hollow rolls engaging the surface of the cylinder, sprockets on said rolls, a driving chain engaging each sprocket, a second sprocket on one of the rolls, a chain driving said second sprocket from a source of power whereby all rolls are driven, the cylinder being driven frictionally by the rolls, a flexible apron enveloping the rolls and passing between them and the cyinder, pipes for introducing steam to each roll and the cylinder, and pipes for removing spent and condensed steam from each roll and the cylinder.

14. In a rotary felting machine, the combination of a hollow cylinder, a series of hollow rolls engaging the surface of the cylinder, sprockets on said rolls, a driving chain engaging each sprocket, a second sprocket on one of the rolls, a chain driving said second sprocket from a source of power whereby all rolls are driven, the cylinder being driven frictionally by the rolls, a flexible apron enveloping the rolls and passing between them and the cylinder, means for conducting steam through each roll and the cylinder, and means for removing the water of condensation from each roll and the cylinder.

In testimony whereof I affix my signature.

FREDERICK C. STURGIS.